INVENTOR.
HOWARD M. POLLACK

United States Patent Office 3,550,128
Patented Dec. 22, 1970

3,550,128
GAIN ADJUSTMENT MEANS FOR BEAM COUPLERS
Howard M. Pollack, Teaneck, N.J., assignor to The Bendix Corporation, a corporation of Delaware
Filed May 23, 1968, Ser. No. 731,586
Int. Cl. G01c 21/00
U.S. Cl. 343—107                                             8 Claims

ABSTRACT OF THE DISCLOSURE

Apparatus for controlling an aircraft in response to beam displacement signals. A signal corresponding to the absolute value of beam displacement is compared to a signal corresponding to the square of beam displacement for providing a difference signal. The difference signal is integrated and beam displacement signal gain is changed as a function of the integrated signal.

BACKGROUND OF THE INVENTION

Field of the invention

This invention relates to flight control systems and, more particularly, to systems for controlling an aircraft in response to gain adjusted beam displacement signals.

Description of the prior art

In order to maintain stability and accuracy when controlling an aircraft in response to beam displacement signals as the aircraft follows a localizer or glide slope radio beam and approaches a ground based transmitter, the gain adjustment of the beam coupler is changed. Prior to the present invention, this was accomplished by changing gain adjustment as a function of altitude or time. There are several problems associated with systems of this kind. For example, terrain variations cause gain fluctuation if radio altitude is used and barometric altitude requires correction for each particular location. Time responsive apparatus is restricted to a relatively small set of perturbations about a nominal situation.

SUMMARY OF THE INVENTION

The device of the present invention provides beam adaptive means for changing gain adjustment and performs effectively in the presence of beam noise, wind disturbances and speed variations. Signals corresponding to the square of beam displacement and to the absolute value of beam displacement are applied to a summing means, and which summing means provides a signal corresponding to the difference between said signals. The difference signal is integrated and beam displacement signal gain adjustment is changed as a function of the integrator signal. The aircraft is controlled in response to the gain adjusted beam displacement signal.

One object of this invention is to provide a system for controlling an aircraft to follow a radio beam to touchdown in response to gain adjusted beam displacement signals, and including means for insuring good stability from system engage to touchdown.

Another object of this invention is to change beam displacement signal gain in response to the integrated difference between signals corresponding to the absolute value of beam displacement and to the square of beam displacement.

Another object of this invention is to change beam displacement signal gain independent of the altitude of the craft.

Another object of this invention is to change beam displacement signal gain independent of the time to touchdown.

Another object of this invention is to provide beam adaptive means for changing beam displacement signal gain, and whereby the gain depends on the actual performance of the system.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
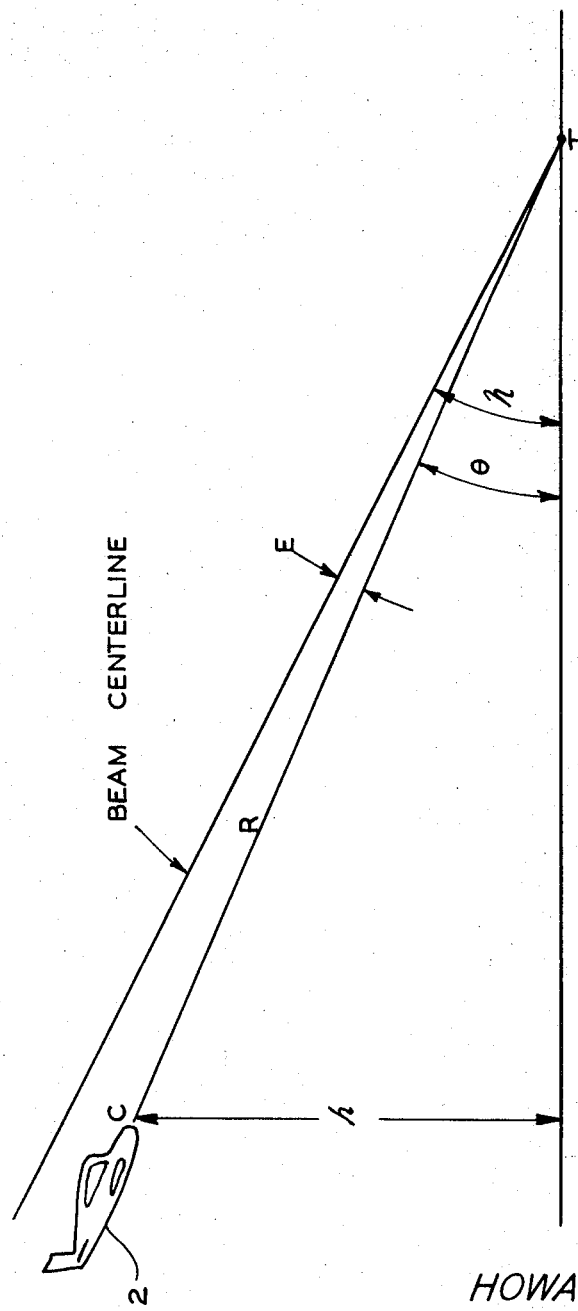
FIG. 1 is a diagrammatic representation of a flight profile showing the parameters involved in the present invention.

With reference to FIG. 1, an aircraft 2, considered as a point mass at C is flying at an altitude $h$. A radio beam transmitting station at a point T provides convergent radio beams for guiding aircraft 2 to touchdown. The slant range from point C to point T is designated as R. The beam centerline is at an angle $\eta$ from the horizontal. The angular displacement or error of aircraft 2 from the beam centerline ($\eta - \theta$, where $$\theta = \tan^{-1}\frac{h}{R}$$

and is assumed to be a small angle) is designated as E.

Using small angle assumptions, angular displacement E is defined as follows:

$$E = \frac{R\eta - h}{R} \qquad (1)$$

Assuming that aircraft 2 is flying at a constant velocity V:

$$R = R_o - Vt \qquad (2)$$

where $t$ is time and $R_o$ is initial slant range; and $$\dot{E} = \frac{-R\dot{h} - Vh}{R^2} \qquad (3)$$

and $$\ddot{h} = 2V\dot{E} - R\ddot{E} \qquad (4)$$

wherein $\dot{h}$ is altitude rate, $\dot{E}$ is beam displacement rate and $\ddot{E}$ is displacement acceleration.

Considering that aircraft 2 flies parallel to the beam centerline expressions for $\dot{h}$, $\dot{E}$ and $\ddot{E}$ are as follows:

$$\dot{h} = -V\eta \qquad (5)$$

$$\dot{E} = \left(\frac{V}{R}\right)E \qquad (6)$$

(from Equations 5 and 3); and $$\ddot{E} = \frac{2V^2}{R^2}E \qquad (7)$$

Considering airframe and control system transfer functions as unity, altitude rate $\dot{h}$ may be expressed as follows:

$$\dot{h} = VGEK_\mathrm{D} + \int_o^t VK_\mathrm{I}GE\,dt \qquad (8)$$

where G is variable beam displacement signal gain and $K_\mathrm{D}$ and $K_\mathrm{I}$ are constant system gains.

Differentiating Equation 8 and re-arranging terms (assuming that velocity V is constant) the following equation is obtained:

$$\frac{\ddot{h}}{VK_D} = \dot{G}E + \dot{E}G + \frac{K_I}{K_D}GE \quad (9)$$

Considering gain G to vary as the absolute value of angular displacement E, expressions for gain G and gain rate $\dot{G}$ are as follows:

$$G = \nu|E| \quad (10)$$

and $$\dot{G} = \pm \nu \dot{E} \quad (11)$$

where $\nu$ is an arbitrary constant.

Substituting Equations 10 and 11 into Equation 9, the following expression is obtained:

$$\frac{\ddot{h}}{VK_D} = \pm \nu E \dot{E} + \nu \dot{E}|E| + \frac{K_I}{K_D}\nu E|E| \quad (12)$$

In connection with Equation 12, it is to be noted that the sign duality ($\pm$) is due to the differentiation of the absolute value of beam displacement E. The plus sign applies when displacement E is positive and the minus sign applies when displacement E is negative.

In order to examine the stability of Equation 12, it is considered that aircraft 2 is flying at a constant velocity nearly parallel to the beam centerline so that the quantity $$\frac{\ddot{h}}{VK_D}$$

is essentially zero. Then, dividing by $|E|$, the following is obtained:

$$2\dot{E} + \frac{K_I}{K_D}E = 0 \quad (13)$$

Solving Equation 13 for E, Equation 14 is obtained:

$$E = E_o e^{\frac{K_I}{2K_D}t} \quad (14)$$

where $E_o$ is some initial beam displacement. Thus, beam displacement varies exponentially as a function of time to provide damped system response and stability.

Figure 2:
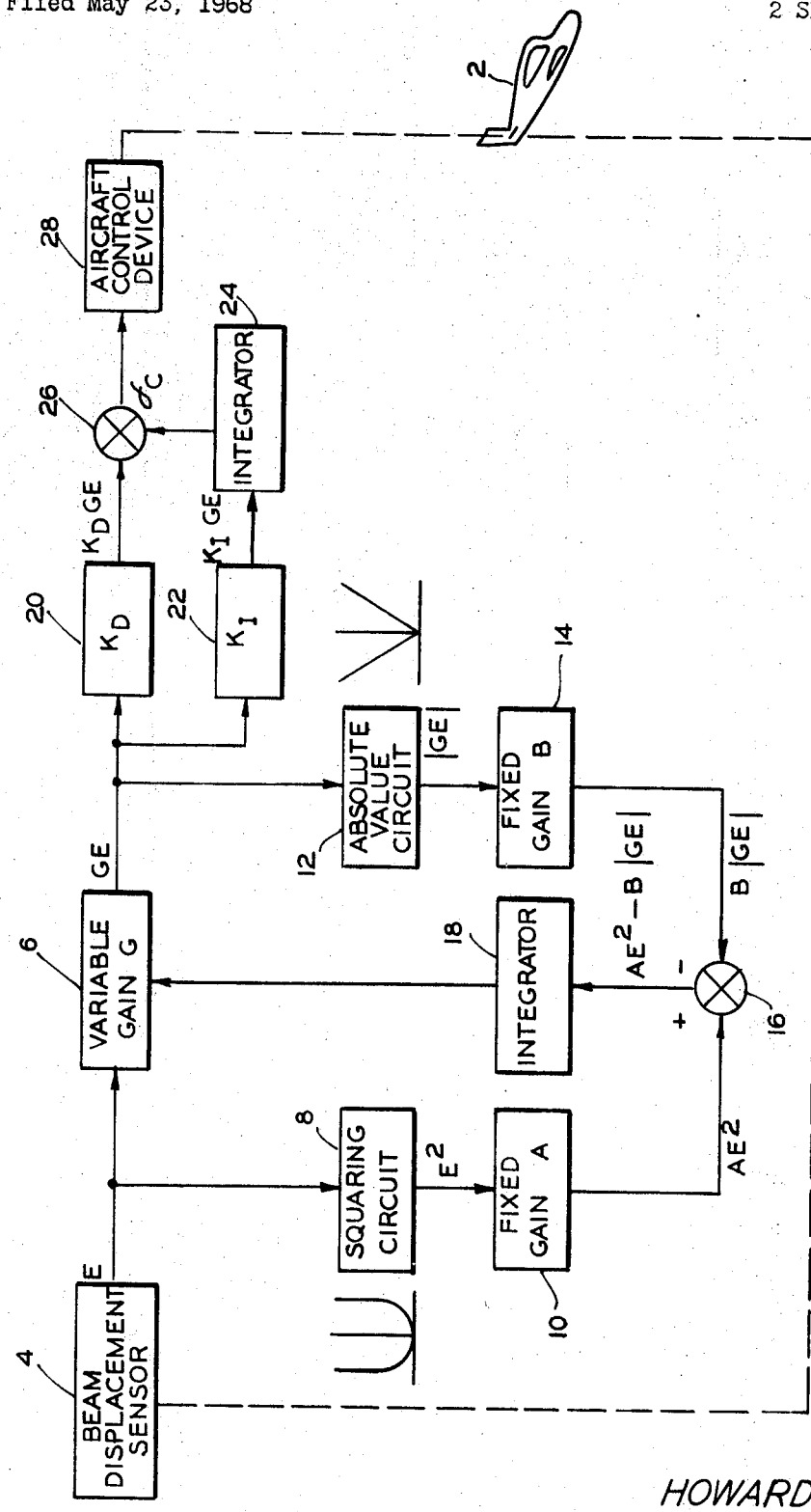
FIG. 2 is a block diagram showing a flight control system according to the invention.

With reference now to FIG. 2, a system is shown where the gain relation shown by Equation 10 is approximated by the following equation:

$$\dot{G} = AE^2 - B|EG| \quad (15)$$

From Equation 15 it may be seen that for lower values of $\dot{G}$, the gain is substantially proportional to the absolute value of beam displacement E. In this connection it is to be noted that approximating gain G in accordance with Equation 15 is preferred to using the absolute value of beam displacement E directly as in Equation 10 in that some gain is maintained even when displacement E is zero and the sensitivity to beam noise is reduced without a corresponding performance compromise.

FIG. 2 shows a beam displacement sensor 4 mounted on aircraft 2 for providing a signal E corresponding to the displacement of aircraft 2 from the centerline of the glide slope beam shown in FIG. 1. Signal E from beam displacement sensor 4 is applied to a gain adjusting device 6 having a variable gain G, and which device 6 provides a signal GE. Signal E is applied to a squaring circuit 8 which provides a signal $E^2$ and therefrom to a gain adjusting device 10 having a fixed gain A, and which device 10 provides a signal $AE^2$.

Signal GE from gain adjusting device 6 is applied to an absolute value circuit 12 which provides a signal $|GE|$, and which signal is applied to a gain adjusting device 14 having a fixed gain B for providing a signal $B|GE|$.

Signal $AE^2$ from gain adjusting device 10 and signal $B|GE|$ from gain adjusting device 14 are applied to a summing means 16 which sums the signals and provides a signal $(AE^2 - B|GE|)$ corresponding to the difference therebetween. The difference signal is applied to an integrator 18 which integrates the difference signal and provides a signal for changing gain G of gain adjusting device 6.

Signal GE from gain adjusting device 6 is applied to a gain adjusting device 20 having a gain $K_D$ and to a gain adjusting device 22 having a gain $K_I$. Gain adjusting device 20 provides a signal $K_D GE$ and gain adjusting device 22 provides a signal $K_I GE$. Signal $K_I GE$ is applied to an integrator 24, and the integrator signal therefrom is applied to a summing means 26. Signal $K_D GE$ from gain adjusting device 20 is applied to summing means 26, and which summing means 26 sums the signals from device 20 and from integrator 24 and provides a control signal $\sigma_c$. Signal $\sigma_c$ is applied to an aircraft control device 28, which may be an autopilot for controlling aircraft 2. In this connection it is to be noted that control device 28 may also be a flight director and in which event integrator 24 is eliminated from the system.

From the foregoing discussion it may be seen that the device of the present invention assures good stability and performance from engage altitude to, for example, flare altitude, and at which altitude the glide slope beam is disregarded as a reference. Terrain variations have no effect on the gain adjustment, nor is the system adversely affected by complexities arising from the use of barometric or radio altitude. Moreover, the system is beam adaptive since it is affected by the actual performance of the system.

Simulation studies comparing various kinds of gain adjustment apparatus indicate a superiority of the system of the present invention in a variety of realistic situations of engage altitude, wind shear and beam noise disturbances. This superiority is demonstrated by low beam error in proximity to the beam transmitter and less aircraft pitch activity as compared to apparatus for adjusting beam displacement signal gain as a function of altitude or time.

Although but a single embodiment of the invention has been illustrated and described in detail, it is to be expressly understood that the invention is not limited thereto. For example, although the description of the invention is related to glide slope apparatus, the invention is applicable as well to localizer or vertical omni-range (VOR) systems. Various changes may also be made in the design and arrangement of the parts without departing from the spirit and scope of the invention as the same will now be understood by those skilled in the art.

What is claimed is:

1. Apparatus for controlling the flight of an aircraft, comprising:
   means for providing beam displacement signals;
   variable gain means for adjusting the gain of the beam displacement signals;
   means for controlling the aircraft in response to the gain adjusted beam displacement signals;
   means for providing signals corresponding to the square of beam displacement;
   means for providing signals corresponding to the absolute value of the gain adjusted signals; and
   the gain adjusting means being connected to the beam displacement square signal means and to the absolute value signal means so that the gain adjustment thereof is varied in response to said signals.

2. Apparatus as described by claim 1 wherein the means for controlling the aircraft in response to the gain adjusted beam displacement signals includes:
   first means having a predetermined gain connected to the gain adjusting means for adjusting the gain of the signals therefrom;
   second means having a predetermined gain connected to the gain adjusting means for adjusting the gain of the signal therefrom;
   means connected to the first and second means for summing the signals therefrom and for providing a summation signal; and
   means connected to the summing means for controlling the aircraft in response to the summation signal.

3. Apparatus as described by claim 2, including:
an integrator connected to the second means for integrating the signal therefrom; and
the summing means being connected to the integrator and to the first means for providing the summation signal in response to the signals therefrom.

4. Apparatus as described by claim 1, wherein the means for providing a signal corresponding to the square of beam displacement includes:
a squaring circuit connected to the beam displacement signal means for squaring the signal therefrom to provide the signal corresponding to the square of beam displacement.

5. Apparatus as described by claim 1, wherein the means for providing a signal corresponding to the absolute value of beam displacement includes:
an absolute value circuit connected to the beam displacement signal means and responsive to the signal therefrom for providing the absolute value signal.

6. Apparatus as described by claim 1, including:
first means having a predetermined gain connected to the beam displacement square signal means for adjusting the gain of the signal therefrom;
second means having a predetermined gain connected to the absolute value signal means for adjusting the gain of the signal therefrom; and
the gain adjusting means being connected to the first and second means so that the gain adjustment thereof is changed in response to the signals therefrom.

7. Apparatus as described by claim 6, including:
means connected to the first and second means for summing the signals therefrom;
an integrator connected to the summing means for integrating the signal therefrom; and
the gain adjusting means being connected to the integrator so that the gain adjustment thereof is changed in response to the integrator signal.

8. Apparatus for controlling the flight of an aircraft, comprising:
means for providing a beam displacement signal;
variable gain means for adjusting the gain of the beam displacement signal;
first means connected to the variable gain means for adjusting the gain of the signal therefrom to a predetermined level;
second means connected to the variable gain means for adjusting the gain of the signal therefrom to another predetermined level;
an integrator connected to the second means for integrating the signal therefrom;
summing means connected to the first means and to the integrator for summing the signals therefrom;
control means connected to the summing means for controlling the aircraft in response to the summation signal;
a squaring circuit connected to the beam displacement signal means for squaring the signal therefrom;
an absolute value circuit connected to the variable gain means for providing a signal corresponding to the absolute value of the signal therefrom;
third means connected to the squaring circuit for adjusting the gain of the signal therefrom;
fourth means connected to the absolute value circuit for adjusting the gain of the signal therefrom;
other summing means connected to the third and fourth means for summing the signals therefrom;
another integrator connected to the summing means for integrating the signal therefrom; and
the variable gain means connected to the integrator so that the gain adjustment thereof is changed in response to the integrator signal.

References Cited

UNITED STATES PATENTS

| | | | |
|---|---|---|---|
| 2,886,760 | 5/1959 | Noxon et al. | 244—77X |
| 3,203,652 | 8/1965 | Doniger et al. | 244—77 |
| 3,223,362 | 12/1965 | Doniger | 244—77 |
| 3,323,124 | 5/1967 | Handberg | 244—77X |
| 3,381,295 | 4/1968 | Blackledge | 343—108 |

ROBERT F. STAHL, Primary Examiner

U.S. Cl. X.R.

244—77